Oct. 24, 1939.   W. C. WAGNER   2,177,085

COMPENSATED METER

Filed March 21, 1936

WITNESS:
Rob R Kitchel.

INVENTOR
Walter C. Wagner
BY
Augustus B. Stoughton.
ATTORNEY.

Patented Oct. 24, 1939

2,177,085

UNITED STATES PATENT OFFICE 2,177,085

COMPENSATED METER

Walter C. Wagner, Ardmore, Pa.

Application March 21, 1936, Serial No. 70,135

1 Claim. (Cl. 73—233)

My invention relates to gas meters and more particularly relates to a meter which is compensated for changes in temperature of the gas metered.

Gas is customarily delivered to the consumer through pipes which are subject to climatic changes in temperature and to distributional variations in pressure, with consequent variations in the amount of heat units delivered for a given meter registration.

The primary object of my invention is to provide a gas meter in which these defects are overcome by means of a linkage connecting said flag rod and the bellows of the meter and having an element forming a part of said linkage, said element being responsive to a condition which changes the volume of the gas, and said linkage being adapted to convert the reciprocating movement of the bellows to oscillating movement of the flag rod and to vary the magnitude of said reciprocating movement in accordance with a function of said condition for a fixed amplitude of oscillation of said flag rod.

Another object of my invention is to produce a temperature-compensated gas meter.

Still another object of my invention is to produce a device of the character described which is simple and durable in construction, inexpensive to manufacture, and which has a maximum efficiency.

With these and other objects in view, which will become apparent as the description proceeds, my invention embodies a gas meter in which the volume of gas delivered per unit of registration is controlled by temperature-sensitive elements adapted to vary the measured volume per unit registration in accordance with any desired function of changes in gas temperature.

The invention, both as to details of construction and combination of parts, will be better understood by the following description of specific embodiments, when read in connection with the accompanying drawing, in which.

Figure 2:
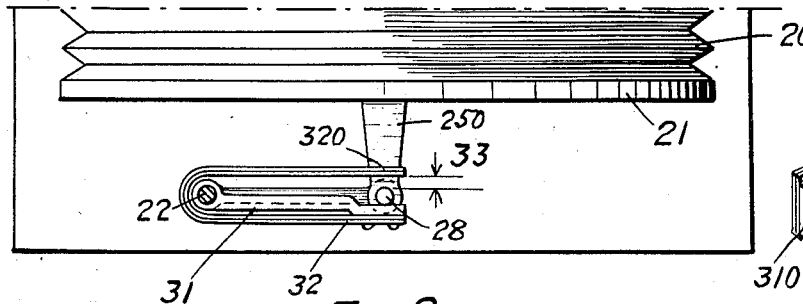
Fig. 2 is a fragmentary section on the line 2—2 of Fig. 1.
Figure 1:
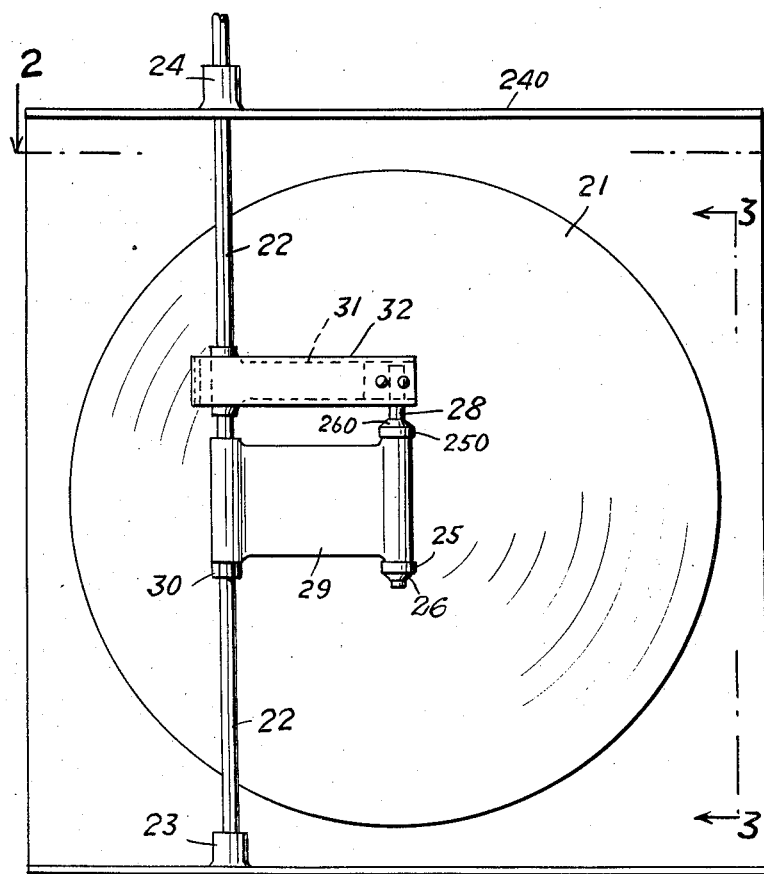
Fig. 1 is a fragmentary front elevation of my gas meter with the outer casing removed, showing the temperature-compensating element.
Figure 3:
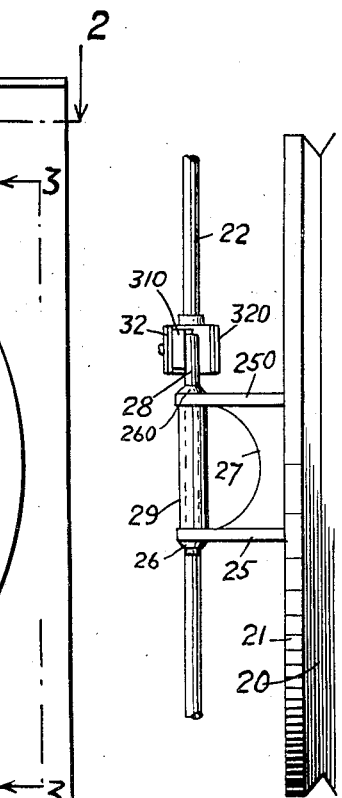
Fig. 3 is a fragmentary side elevation on the line 3—3 of Fig. 1.

Referring now to the drawings, I show in Figs. 1, 2 and 3 a bellows-type gas meter in which the gas enters and expands bellows 20, causing face plate 21 of bellows 20 to move outwardly and partially rotate a flag rod or shaft 22 by means of a linkage presently to be described. Flag rod 22 controls a valve gear (not illustrated) which, at a predetermined expanded condition of bellows 20, closes a port (not shown) leading the gas into said bellows. Said valve mechanism (not shown) is also connected to a second bellows in such manner that expansion of the second bellows continues the movement of the valve gear when the port leading into bellows 20 is closed. The continued movement of the valve gear due to the second bellows then opens a port admitting gas externally to bellows 20, and at the same time opening a channel for the escape into an outlet pipe (not shown) of the gas within bellows 20, thereby collapsing said bellows.

A dial or other register (not illustrated) is suitably connected to the valve mechanism to integrate the oscillations of flag rod 22, the integrated total of said oscillations being proportional to the volume of gas which has passed through the meter. The register thus registers the number of operations of the valve mechanism.

Flag rod 22 is supported on a bearing 23 and passes through a gas-tight top bearing 24 in the top casing 240. The angle through which flag rod 22 oscillates is definitely fixed by the valve gear mechanism (not shown) connected to said shaft.

The linkage between plate 21 and flag rod 22, which converts reciprocating movement of said plate to oscillating movement of said shaft, comprises brackets 25 and 250 fixed to the central part of plate 21, each carrying a bearing 26 and 260, respectively, and being braced and interconnected by a web 27, a hinge pin 28 fixedly supported within bearings 26 and 260 and having an upper portion projecting above the upper bearing 260, a link 29 pivotally mounted on flag rod 22 and between bearings 26 and 260 on pin 28, and a lever 31 fixed to flag rod 22 and carrying a U-shaped bimetal element 32 affixed to the free end 310 of said lever 31.

Link 29 is of relatively large transverse width so that it can carry the weight of plate 21 without undue strain, is prevented from sliding down flag rod 22 by a collar 30 fixed to said shaft, and is adapted to hold pin 28 parallel to flag rod 22.

Lever 31 is attached to flag rod 22 at a point above link 29 and projects at right angles to said shaft to a point beyond pin 28 so that it lies in the path of pin 28 as said pin reciprocates under the action of bellows 20.

Lever 31 is parallel to and lies completely within the U of element 32 whose curved part also encloses flag rod 22. Pin 28 occupies the space between end 310 of lever 31 and end 320 of element 32 and alternately pushes these members outwardly and inwardly, respectively, as bellows 20 is expanded or collapsed, respectively.

The operation of the device is as follows:

Gas enters and expands bellows 20, moving plate 21, brackets 25 and 250, and pin 28 outward. When pin 28 impinges on end 310, lever 31 and flag rod 22 are rotated until the gas port leading into bellows 20 is closed, whereupon expansion of the bellows ceases. Further movement of the valve gear due to expansion of the second bellows causes opening of the exhaust port of bellows 20 and of the entrance port to the exterior of bellows 20, resulting in collapse of said bellows. As pin 28 moves inwardly, it leaves lever end 310 and impinges on end 320 of element 32 after which continued collapse of the bellows rotates lever 31 inwardly until the valve gear operated by rotation of flag rod 22 closes the gas port to the exterior of bellows 20. An equal volume of gas is required to expand or collapse the second bellows through the distance 33 of free motion of pin 28 between element 320 and lever end 310. Therefore an arrangement is made whereby the temperature sensitive-element controls the amount of gas admitted to both bellows or a duplicate arrangement similar to that shown in Figs. 1 through 4 is used with the second bellows.

Expansion or collapse of bellows 20 through the distance 33 of free motion between element 320 and lever end 310 permits flow of an additional volume of gas per oscillation of flag rod 22 than would be the case if this free motion (distance 33) were reduced to zero. Conversely, increasing of distance 33 increases the gas volume per oscillation or per unit registration. The distance 33 is determined by bimetal element 32 in accordance with its response to the ambient temperature, a rise in temperature resulting in lengthening distance 33 and increasing the volume of gas per unit of registration, and vice versa.

Figure 4:
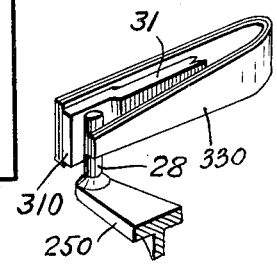
Fig. 4 is a perspective view in detail of a modified form of the device shown in Figs. 1 through 3.

As shown in Fig. 4, instead of the bimetal element 32 being formed of a strip of uniform cross-section, a strip 330 of triangular shape or outline and of the same thickness, length and area and bent into a U may be used as a beam of uniform strength. For the same amount of bimetal, such a construction would have the same temperature response, a 33% increased resisting force at the free end, and a 43% lower maximum stress than the illustrated element.

Although particular embodiments of my invention have been described in considerable detail, the description is to be considered as illustrative rather than limiting, as various modifications will be obvious to those skilled in the art. My invention, therefore, is to be limited only by the prior art and the spirit of the appended claim.

I claim:

In a gas meter of the bellows-type which registers the number of operations of a valve mechanism controlling the inflation and collapse of the bellows, an oscillating flag rod operating said mechanism, and a linkage connecting said flag rod with the bellows, said linkage being adapted to convert the reciprocating movement of the bellows to oscillating movement of the flag rod and to vary the magnitude of said reciprocating movement in accordance with a function of gas temperature for a fixed amplitude of oscillation of said flag rod, said linkage comprising a lever affixed to said flag rod, a U-shaped bimetal element with the U in a plane perpendicular to said flag rod and attached at one end to the free end of said lever, and a pin reciprocable parallel to itself and to said flag rod by said bellows, said pin being adapted to move between the ends of the U shaped element without rotating said lever for part of the reciprocating movement.

WALTER C. WAGNER.